Aug. 12, 1941.   H. T. KRAFT   2,252,128
FRICTIONAL TORQUE TRANSMITTING DEVICE
Filed Aug. 2, 1940   2 Sheets-Sheet 1
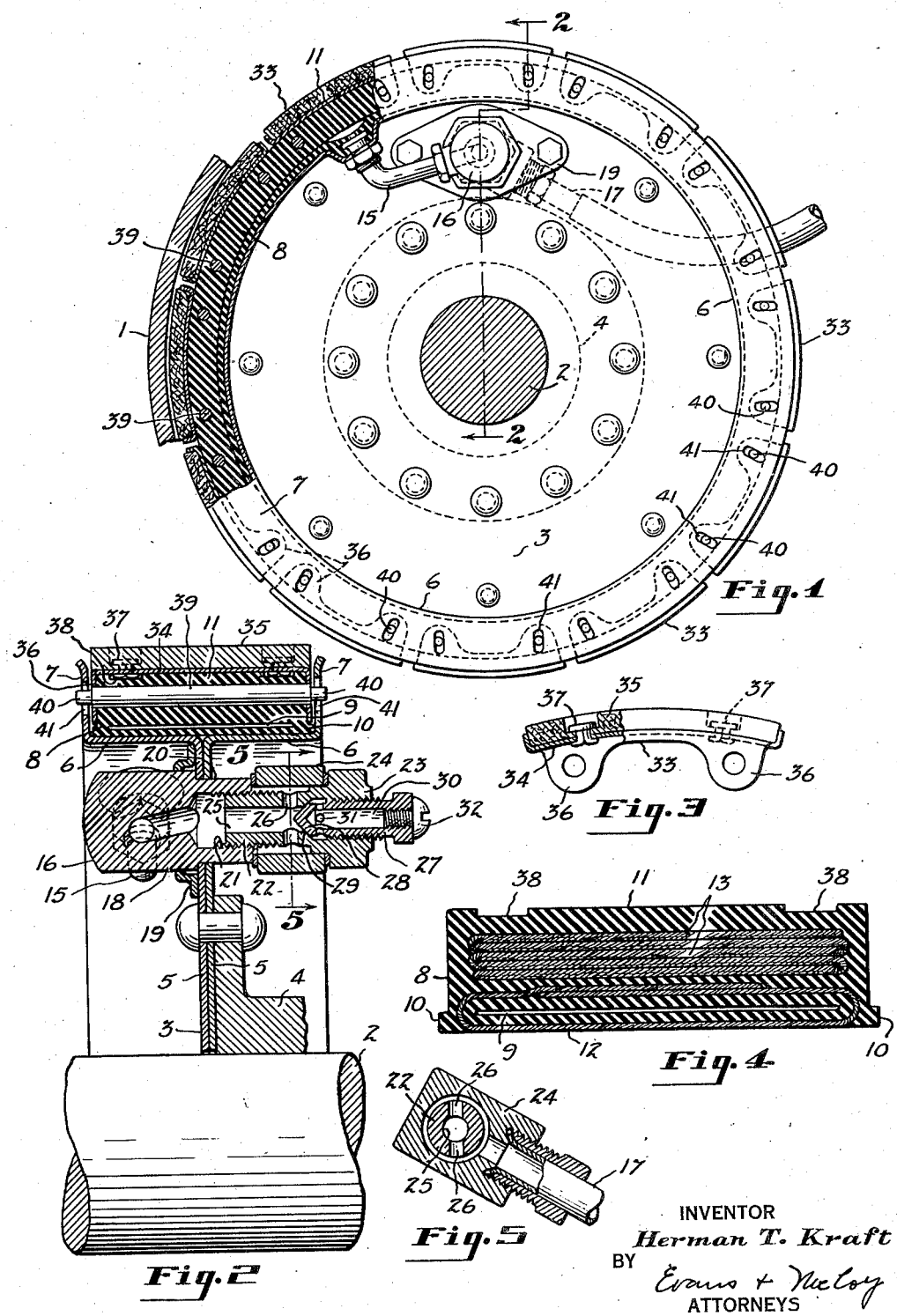
INVENTOR
Herman T. Kraft
BY
Evans + McCoy
ATTORNEYS Aug. 12, 1941.   H. T. KRAFT   2,252,128
FRICTIONAL TORQUE TRANSMITTING DEVICE
Filed Aug. 2, 1940   2 Sheets-Sheet 2

INVENTOR
Herman T. Kraft
BY Evans & McCoy
ATTORNEYS

Patented Aug. 12, 1941

2,252,128

UNITED STATES PATENT OFFICE 2,252,128

FRICTIONAL TORQUE TRANSMITTING DEVICE

Herman T. Kraft, Akron, Ohio, assignor to The General Tire & Rubber Company, Akron, Ohio, a corporation of Ohio Application August 2, 1940, Serial No. 349,543

7 Claims. (Cl. 188—152)

This invention relates to releasable frictional torque transmitting devices and particularly to brakes of the fluid pressure operated type suitable for use on airplane landing wheels, the device of the present invention being an improvement upon the device disclosed in co-pending application Serial No. 301,970, filed October 30, 1939.

It is desirable that the brakes used on airplane landing wheels be light in weight, and since the brakes may be subjected to enormous loads when operated in landing, it is desirable that the brakes be so constructed as to effectively dissipate the heat generated at the friction surfaces.

It is also desirable that the brakes be capable of positively locking the wheels to hold the plane against movement while the engine is being tuned up preparatory to starting, and since the plane is steered along the ground by manipulating the wheel brakes, the shoe actuating means of each brake should be of a character such that it is readily responsive to the controlling mechanism.

The main objects of the present invention are to provide an expansible and contractible drum engaging friction element which is of simple and rugged construction composed of parts readily accessible for replacement and repair, and to provide a construction such that heat generated by frictional engagement of the shoes with the drum is rapidly dissipated.

A further object of the invention is to provide a drum engaging element composed of a series of brake shoes adapted to be simultaneously moved into engagement with the drum by means of an inflatable annulus, and provide means for securely attaching the brake shoes to the annulus and to prevent circumferential movement of the shoes with respect to the supporting member upon which the shoes and annulus are mounted.

With the above and other objects in view the invention may be said to comprise the device as illustrated in the accompanying drawings hereinafter described and particularly set forth in the appended claims, together with such variations and modifications thereof as will be apparent to those skilled in the art to which the invention appertains. Reference should be had to the accompanying drawings forming a part of this specification, in which:

Figure 1 is a side elevation of a torque transmitting device embodying the invention with a portion of the expansible annulus and drum shown in section;

Fig. 2 is a section taken on the line indicated at 2—2 in Fig. 1;

Fig. 3 is a side elevation of one of the brake shoes with one end portion broken away and shown in section;

Fig. 4 is a transverse section through the inflatable rubber annulus;

Fig. 5 is a section taken on the line indicated at 5—5 in Fig. 2;

Figure 6:
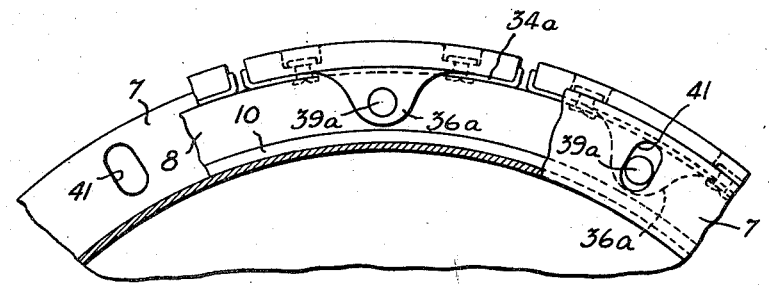
Fig. 6 is a fragmentary side elevation of the peripheral portion of the inner torque transmitting member showing a shoe of modified construction.

The torque transmitting device of the present invention is engageable with the interior of a drum 1 which may be mounted upon an axle or shaft 2, the drum in this instance being the outer torque transmitting member which coacts with an inner torque transmitting member 3 which has a hub 4 mounted upon the axle or shaft 2. The member 3 is formed by joining two identical cup-shaped disks 5 back to back. The peripheral portions of the disks are formed to provide cylindrical portions 6 and flat marginal flanges 7, the portions 6 and 7 of the disks providing an outwardly facing channel at the periphery of the supporting member in which is mounted an expansible rubber annulus 8. The base of the annulus is seated upon the cylindrical bottom of the channel formed by the cylindrical portion 6 of the disk and adjacent its base is provided with a shallow transversely elongated cavity 9. The base portion of the annulus is of a width to fit between the flanges 7, being provided with laterally projecting shoulders 10. Outwardly of the shoulders 10, the annulus is narrower than the base portion, so that outwardly of the shoulders 10 the side faces of the annulus are spaced inwardly from the side flanges 7 of the channel in which the annulus is mounted. Outwardly of the cavity 9 the annulus is provided with a relatively thick tread portion 11. A single ply 12 of fabric reinforcement extends around the cavity 9 of the annulus and the tread 11 is reinforced by several superposed plies of cord fabric 13 which extend throughout the major portion of the width of the tread. The plies of reinforcing fabric 12 and 13 consist of parallel cords which extend transversely across the annulus, preferably parallel to the axis of the annulus. The cords so disposed will permit radial expansion of the annulus but will resist lateral expansion due to fluid pressure or due to radial pressure against the drum surface.

The internal cavity 9 of the annulus is connected by a stem 15 to a fitting 16 mounted on the supporting member 3 and through the fitting 16 to a tube 17 which extends to a suitable source of fluid under pressure such as a cylinder provided with a pedal operated piston (not shown), the annulus being expanded by admission of fluid under pressure into the cavity 9, the fluid being preferably liquid such as commonly used in hydraulic brakes. The fitting 16 has an inner section 18 connected to the stem 15 and held in place on the member 3 by means of a retaining plate 19. Section 18 has a stem 20 which extends through an aperture in the disks 5 and the stem 20 has an internally threaded bore 21 which receives the threaded stem 22 of an outer bleeder valve section 23. An intermediate section 24 to which the tube 17 is connected is clamped between the sections 18 and 23. The bleeder valve section 23 is provided with a bore 25 having lateral openings 26 through which communication is established with the tube 17. A threaded valve member 27 is mounted in the outer end of the section 23 and this valve member has a tapered inner end 28 which engages with the tapered valve seat 29. The valve member 27 has a bore 30 extending inwardly from its outer end and lateral openings 31 outwardly of the closed tapered end 28. The outer end of the bore 30 is closed by a threaded plug 32. The bleeder valve serves to permit escape of air trapped in the system. When it is desired to bleed air from the system the threaded plug 32 is removed and the valve 27 is screwed slightly away from the seat 29 so that air may pass from the bore 25 through the open end of the valve member. Escape of any excessive amount of liquid may be prevented by screwing the valve 27 to closed position when liquid begins to flow through the valve member.

A series of shoes 33 closely spaced throughout the circumference of the annulus are mounted upon the tread portion 11 of the annulus. Each of these shoes comprises a metal base member 34 and a friction facing 35 for engagement with the friction surface of the drum. Each base member 34 has side flanges 36 which extend inwardly toward the bottom of the channel in which the shoes and annulus are mounted and which closely overlie the opposite side faces of the tread portion 11 of the annulus 8. The facing 35 is a suitable wear resistant friction material and may be secured to the base member 34 by suitable means such as rivets 37. The periphery of the tread portion 11 of the rubber annulus may be provided with circumferential grooves 38 to accommodate the rivets 37. The shoes 33 are held against circumferential movement with respect to the inner torque transmitting member by means of pins 39 which extend through the tread 11 of the annulus and through the apertures in the side flanges 36 of the base members 34. The pins 39 have reduced end portions 40 which project laterally from the side flanges 36 into substantially radial slots 41 formed in the flanges 7 which form the side walls of the mounting channel. The pins 39 provide a direct torque transmitting connection between the individual shoes 33 and the inner torque transmitting member upon which the shoes are mounted, and also serve to rigidly secure the shoes to the tread of the rubber annulus. The shoes 33 are of less width than the channel in which they are mounted, and since the rubber annulus 8 is centered by means of the shoulders 10 between the side flanges 7 of the channel, the side faces of the shoes formed by the flanges 36 are spaced inwardly from the faces of the inner flanges 7 to provide air spaces between opposite sides of the shoes and the opposite side walls of the mounting channel for dissipation of heat.

As shown in Fig. 1, two fastening and torque transmitting pins 39 are provided for each shoe, the pins of each shoe being disposed adjacent opposite ends thereof. If desired, however, each shoe may be secured to the tread and connected to the supporting member by a single pin as shown in Fig. 6. The shoe shown in Fig. 6 has a base member 34a with side flanges 36a bearing against the side faces of the tread 11 and disposed midway between the ends of the shoe. Pins 39a, one for each shoe, extend through the flanges 36a and engage in radial slots 41 in the side flanges 7 of the mounting channel.

Figure 7:
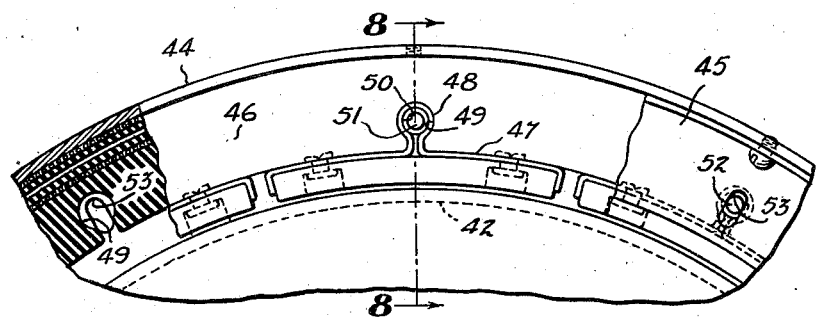
Fig. 7 is a fragmentary side elevation showing the expansible torque transmitting element applied to the exterior of a drum.
Figure 8:
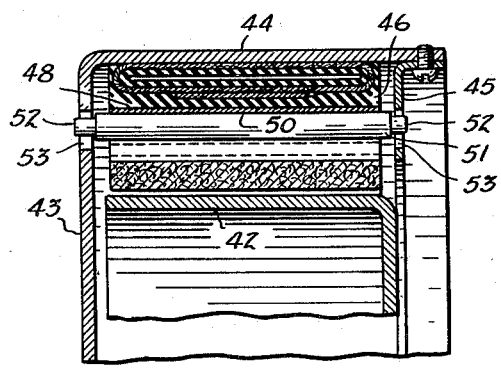
Fig. 8 is a section taken on the line indicated at 8—8 in Fig. 7.
Figure 11:
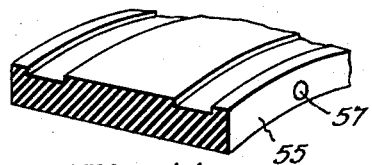
Fig. 11 is a fragmentary sectional perspective view of the tread portion of the annulus.
Figure 9:
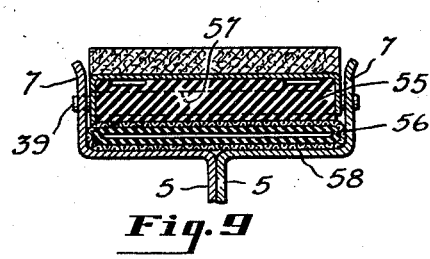
Fig. 9 is a sectional view showing an inflatable shoe supporting annulus of modified construction.
Figure 10:
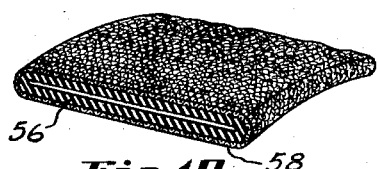
Fig. 10 is a fragmentary sectional perspective view of the expanding tube of the annulus.

Figs. 7 and 8 of the drawings show the expansible engaging device of the present invention coacting with an internally positioned drum. In this instance a drum 42 is the inner torque transmitting member, and an outer torque transmitting member 43 has a cylindrical flange 44 surrounding and spaced from the external peripheral surface of the drum. An inwardly facing mounting channel is formed within the flange 44 by means of a flanged ring 45 secured to the margin of the flange 44 and projecting inwardly therefrom. An expansible annulus 46 similar in construction to the annulus above shown and described is mounted upon the interior of the flange 44 inwardly of the flange ring 45 and centrally of the mounting channel formed between the flange ring 45 and the body of the member 43. The annulus 46 differs from the annulus 8 above described in that the fluid receiving cavity is adjacent the outer periphery thereof which is seated upon the interior of the flange 44 and the tread portion of the annulus is on the interior thereof. The annulus is mounted centrally of the mounting channel to provide air spaces on opposite sides thereof. A series of closely spaced shoes are attached to the interior of the annulus 46 throughout the circumference thereof, and each of the shoes has a base member 47 provided with a central transverse projection 48 which fits in a transverse groove 49 in the tread portion of the annulus. Each projection 48 has an aperture 50 extending throughout its length to receive a torque transmitting pin 51. The pins 51 project beyond the opposite sides of the shoes and have reduced end portions 52 which engage in substantially radial slots 53 formed in the flange ring 45 and in the body of the member 43. The annulus 46 is expanded radially by admission of fluid pressure thereto to force the shoes against the exterior surface of the drum 42.

If desired, the shoe carrying tread portion of the inflatable annulus may be a separately formed rubber band instead of being formed integrally with the fluid receiving portion. In Figs.

9, 10 and 11 of the drawings an inflatable shoe carrying annulus is shown which has a separately formed tread band 55 and a fluid receiving tube 56. This annulus is shown mounted upon a supporting member of the same construction as shown in Figs. 1 and 2 of the drawings. The tube 56 is mounted upon the base of the annulus receiving channel and the shoe carrying tread band 55 is mounted upon the tube 56. Transverse apertures 57 are provided in the tread band 55 to receive the cross pins 39 which secure the shoes to the band and which provide a driving connection between the shoes and the supporting member. As in the modifications previously described, the tread 55 is narrower than the channel to provide air spaces between opposite sides of the annulus and the flanges of the supporting member. In order to provide more rapid dissipation of the heat generated in braking, the tube 56 is preferably covered with a metal mesh fabric 58 which serves to conduct heat to the supporting member and which permits circulation of air about the tube 56.

In each of the modifications disclosed a series of shoes carried by an inflatable annulus are simultaneously moved toward a drum surface upon expansion of the annulus, each shoe has a slidable connection with the annulus support which permits the shoes to move inwardly or outwardly but which restrains relative circumferential movements so that torque is transmitted through the shoes to the support. During engagement of the shoes with the drum the fluid within the annulus exerts a uniform pressure upon all of the shoes and the braking force is depended upon the fluid pressure which may be varied as desired.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The releasable drum engaging element of a torque transmitting device comprising a supporting member having a continuous circumferential channel, a series of shoes slidably mounted in said channel, each shoe comprising a base member and a facing of slip-resisting material, each base member having side flanges extending toward the bottom of the channel, an inflatable annulus mounted in said channel between said shoes and the bottom of the channel, said annulus having a tread portion engaging the base members of the shoes and fitting between the side flanges thereof, means for attaching the brake shoe flanges to said tread, means for guiding each shoe for radial movement in said channel, and means for admitting fluid under pressure to said annulus to expand the same radially.

2. The releasable drum engaging element of a torque transmitting device comprising a supporting member having a continuous circumferential channel, the opposite side walls of said channel having substantially radial guide slots, a series of shoes, each mounted for radial movement in said channel, each shoe comprising a base member and a facing of slip-resisting material, each base member being narrower than the channel and having side flanges extending inwardly toward the bottom of the channel, guide members carried by said base members and projecting laterally from said flanges into said guide slots, an inflatable annulus mounted in said channel and interposed between said shoes and the bottom of the channel, said annulus having a tread portion fitting between the side flanges of the shoes and attached to the shoes, said annulus being mounted centrally of the channel to support the shoes with their opposite side faces spaced inwardly from the side walls of the channel, and means for admitting fluid under pressure to said annulus to expand the same radially.

3. The releasable drum engaging element of a torque transmitting device comprising a supporting member having a continuous circumferential channel, the opposite side walls of the channel having substantially radial slots, a series of circumferentially spaced shoes mounted in said channel, each shoe being narrower than the channel and comprising a base member and a facing of slip-resisting material, each base member having a portion projecting inwardly toward the bottom of the channel, an inflatable annulus interposed between said shoes and the bottom of the channel, said annulus being narrower than the channel and mounted centrally thereof, said annulus having a tread portion engaging the base members of said shoes, pins extending transversely through said tread portion, through the inwardly projecting portions of the base members and engaging in said radial slots, and means for admitting fluid under pressure to said annulus to expand the same radially.

4. The releasable drum engaging element of a torque transmitting device comprising a supporting member having a circumferential channel, the side walls of the channel having substantially radial slots, an expansible and contractible inflatable rubber annulus mounted in said channel, said annulus being narrower than the channel and mounted centrally thereof to provide air spaces between the sides of the annulus and the walls of the channel, said annulus having a circumferential fluid receiving cavity of transversely elongated cross sectional form and relatively thick peripheral tread, said tread having circumferentially spaced transverse pins extending through the same and past the side faces thereof and engaging in the radial slots in the side walls of said channel, shoes attached to the tread of said annulus, each shoe comprising a base member held in place by said pins and a facing of slip-resisting material, and means for admitting fluid under pressure to the cavity of said annulus to expand the same radially.

5. The releasable drum engaging element of a torque transmitting device comprising a supporting member having a circumferential channel, the side walls of the channel having substantially radial slots, an expansible and contractible inflatable rubber annulus mounted in said channel, said annulus being narrower than the channel and mounted centrally thereof to provide air spaces between the sides of the annulus and the walls of the channel, said annulus having a circumferential fluid receiving cavity of transversely elongated cross sectional form and relatively thick peripheral tread, said tread having circumferentially spaced transverse pins extending through the same and past the side faces thereof and engaging in the radial slots in the side walls of said channel, shoes attached to the tread of said annulus, each shoe comprising a base member having a projecting apertured portion through which one of said pins extends and a facing of slip-resisting material, and means for admitting fluid under pressure to the cavity of said annulus to expand the same radially.

6. The releasable drum engaging element of a torque transmitting device comprising a supporting member having a circumferential channel, the side walls of the channel having substantially radial slots, an expansible and contractible inflatable rubber annulus mounted in said channel, said annulus being narrower than the channel and mounted centrally thereof to provide air spaces between the sides of the annulus and the walls of the channel, said annulus having a circumferential fluid receiving cavity of transversely elongated cross sectional form and relatively thick peripheral tread, said tread having circumferentially spaced transverse pins extending through the same and past the side faces thereof and engaging in the radial slots in the side walls of said channel, shoes attached to the tread of said annulus, each shoe comprising a base member having flanges overlying opposite side faces of said tread and provided with apertures through which one of said pins extends and a facing of slip-resisting material, and means for admitting fluid under pressure to the cavity of said annulus to expand the same radially.

7. The releasable drum engaging element of a torque transmitting device comprising a supporting member having a circumferential channel, the side walls of the channel having substantially radial slots, an expansible and contractible inflatable rubber annulus mounted in said channel, said annulus being narrower than the channel and mounted centrally thereof to provide air spaces between the sides of the annulus and the walls of the channel, said annulus having a circumferential fluid receiving cavity of transversely elongated cross sectional form and relatively thick peripheral tread, said annulus being reinforced by a layer of cords surrounding said cavity and layers of cords in said tread portion, said cords extending transversely of the annulus, thereby permitting radial expansion of the annulus but resisting lateral bulging of the annulus under inflation pressure, a series of shoes attached to the tread portion of the annulus, each shoe being narrower than said channel, guide members rigidly connected to the shoes and engaging in said radial slots, and means for admitting fluid under pressure to the cavity of the annulus to expand the annulus and impart simultaneous radial movement to the shoes.

HERMAN T. KRAFT.